United States Patent

[11] 3,564,206

[72] Inventor Peter Lauck, III
 Princeton, N.J.
[21] Appl. No. 866,355
[22] Filed Oct. 14, 1969
 Continuation-in-part of application Ser. No. 810,156, Mar. 25, 1969
[45] Patented Feb. 16, 1971
[73] Assignee J.P. Stevens & Co., Inc.
 New York, N.Y.

[54] FAIL-SAFE SENSOR/OVERRIDE FOR CIRCUIT
 5 Claims, 2 Drawing Figs.
[52] U.S. Cl. .................................................. 219/501,
 219/505
[51] Int. Cl. ................................................. H05b 1/02
[50] Field of Search ........................................ 219/497,
 501, 507, 423, 481; 317/9; 307/310

[56] References Cited
 UNITED STATES PATENTS
 3,303,391 2/1967 Kitami .......................... 307/310
 3,465,175 9/1969 Sutton .......................... 307/310

Primary Examiner—Bernard A. Gilheany
Assistant Examiner—F. E. Bell
Attorney—J. Gibson Semmes ABSTRACT: A temperature override sensor for a control circuit for a heating device including an electric switch and temperature control means to control and regulate the amount of heat developed by a heating device. The temperature override sensor is so connected in the circuit as to be operable to permit normal temperature control operation of activators for the heating element in a desirable ambient temperature condition, and operable under abnormal blanket and ambient temperature conditions to override the normal operating components and circuitry to shut off completely functioning of the heating element or device. This is accomplished by physically mounting the temperature override sensor on a control or operating actuator for the heating element or device, so that a critical sensing of the temperature of the actuating device is compared with the, for example, voltage divider in receptacle and with the temperature range in which the heating device is utilized, the disparity between the two temperature ranges in the voltage divider means, one critical, one wide, permits the use of the safety override device that will cut off any control, and which further does not interfere with the normal operation of the heating control itself unless an untoward or unsafe condition of room temperature or connection plug temperature exists.

PATENTED FEB 16 1971

3,564,206

INVENTOR
PETER LAUCK, III
BY
John Gibson Semmes

FAIL-SAFE SENSOR/OVERRIDE FOR CIRCUIT

This application is a continuation-in-part of my copending application Ser. No. 810,156, filed Mar. 25, 1969, entitled Heating Control Circuit with Triac-Diac Combination.

BACKGROUND OF THE INVENTION

1. Field of the Invention

The invention has particular use in applications utilizing heating devices in which activation of the heating element is controlled by a circuit including means acting as a temperature sensor and control activator for the heating device. The invention has particular use in applications such as electric blankets, or other electrically heated fabrics or materials such as woven or nonwoven drapes, floor coverings and the like for better additional and different consumer protection than that presently provided. (bimetallic means in blanket area)

2. Description of the Prior Art

The prior art discloses utilization of heating devices in, for example, flexible blankets and sheet heating devices, in which actuation of the heating element is controlled by temperature control sensors or actuators such as bimetallic switches, thermostats, silicon controlled rectifier (SCR) circuits, thyristor circuits and the like. Related inventions disclosing circuitry to which the present invention is applicable include: P. Lauck, III U.S. Pat. No. 3,385,958 issued May 28, 1968 entitled Electric Blanket; U.S. Pat. No. 3,422,244 issued Jan. 14, 1969 entitled Electric Blanket with a Temperature Responsive Control Circuit; U.S. Pat. No. 3,437,792, issued Apr. 8, 1969 entitled Electric Heating Device with Temperature Control Means; application Ser. No. 810,156, filed Mar. 25, 1969 entitled Heating Control Circuit with Triac-Diac Combination; and application Ser. No. 810,948, filed Mar. 27, 1969 entitled Heating Control Circuit with SCR-Unijunction Transistor Combination.

Such control circuitry in the prior art accordingly are comprised essentially of "Lauck" temperature control circuits with various selective actuating means for a heating element and the use of sensors regulating sleeping area temperature. The present circuit incorporates a temperature override sensor which preferably is physically placed against a thyristor, SCR or triac, or other device or devices which senses their temperature when they are turned on, and which, when connected in the "Lauck" or other circuits, regulates the supply voltage to the heating element to cut it off to a preset temperature of the actuating device as a function of the disparity of temperature range of operation of the heating device and temperature in the heating element actuator or receptacle itself. This constitutes a safety override device operable under certain operating conditions to permit normal operation of the heating element or provides a complete breaking of the circuit within the control element itself, and complements existing electronics of known sensing and control devices. Additionally, the present invention incorporates utilization of a heat sink for heat dissipation from actuating devices, such for example, as a thyristor or combinations thereof or equivalents.

SUMMARY OF THE INVENTION

The present invention accordingly is directed to a temperature override sensor which serves as a circuit cutoff device which is physically mounted on the case of a heating actuator in a desired control area permitting regulation of heat to a critical degree, and operable upon a given rise in temperature to automatically cut off the circuit operation without impeding normal progress of temperature, even in high settings in a blanket or the like, for operation on a normal mode in a cold room under normal conditions, and whereas in abnormal conditions such as a warm room, rumpled blankets and others will serve, upon rising to a predetermined temperature, to shut off all circuitry and thereby provides a fail-safe for conditions of abuse in use of electric heating systems such as, for example, indicated in the aforementioned patents and pending patent applications but without affecting usual temperature control. The override circuit can constitute a thermostatic mechanism serving as a heat sink in addition to its safety override features, or can comprise an electronic override but in either case the mounting would be physically on the case of an SCR thyristor or other equivalent heating device actuating mechanism.

It is to be understood that the FIGS. of the drawings disclose illustrative embodiments of circuits only, and the invention is in no way to be restricted thereto, since it is susceptible of broader application to different specific control circuits as referred to above, in patented and pending patent application embodiments, or others.

The illustrated circuits have been selected to disclose the basic principle of operation of the present invention, and those skilled in the art can easily adapt this principle as illustrated to other circuits for the same overall concept and operation, some of which will be referred to hereinafter in more detail.

Figure 1:
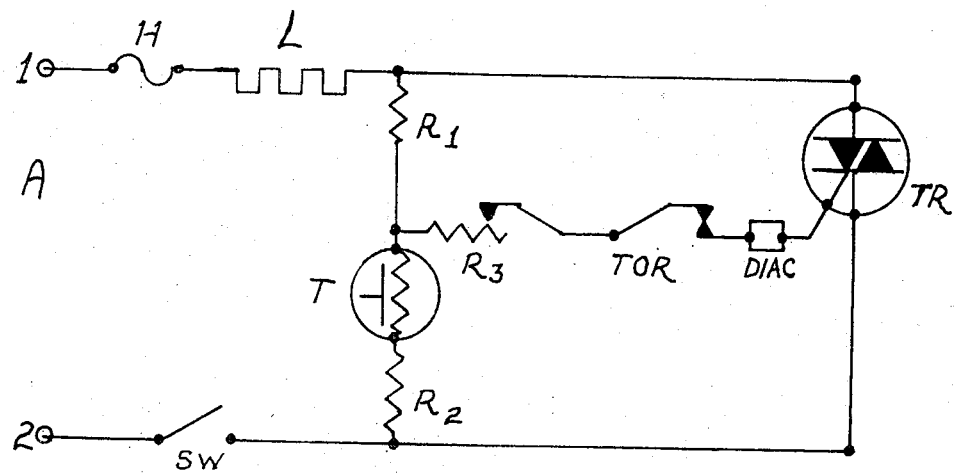
FIG. 1 depicts circuitry in accordance with the invention incorporating a thyristor actuator for a heating element.

In FIG. 1 the heat control circuit as shown includes a conventional alternating current supply applied between input terminals 1 and 2. The series connection of H heating device or heater coil L, resistor R1, Temperature Sensor T, resistor R2 is interconnected to terminals 1 and 2. Additionally, the series connection of heat control actuator shown as a triac TR, but which can be any suitable thyristor, or equivalent and switch SW, utilizing the main terminals of triac TR, is also interconnected to terminals 1 and 2. The sensor can, for example, consist of a thermistor, the term "temperature sensor" by definition is a device which evaluates the temperature and balances and regulates electronics in a circuit. It can have either a positive or negative temperature coefficient, which, depending upon use in conjunction with other variable resistors and/or capacitors, will serve to critically effect triggering or timing of a thyristor or SCR circuit. The foregoing is described in detail in my aforementioned patents and applications for patents.

A temperature override sensor TOR is connected in series with a diac and potentiometer or variable resistor R3 between the gate of Triac (thyristor) TR and the series connection of Temperature Sensor T and resistors R1 and R2. The temperature override sensor TOR can consist of a thermostat such as a bimetallic member, but can include either an electrical/mechanical device or a solid state thermistor device and the like. TOR can be referred to as a thyristor heat sink thermostat when used in the circuit of FIG. 1, and is physically placed on and associated with the case of thyristor TR and thereby senses directly the temperature of the case. Sensor T and the relative values of circuit components including resistor R2, sensor T, and resistor R1, are chosen to control the duty cycle of thyristor TR, depending upon the selected temperature which the heating device is set by potentiometer or variable resistor R3.

The sensor T is preferably placed in an area in which temperature is desired to be controlled, such as a blanket or zone or region thereof, and the actual control is effected by the area controlled by the heating device which affects the temperature of sensor T. Upon energization of the circuit, and upon the heat value or temperature sensed by sensor T being lower than the desired temperature as regulatable by variable resistance R3, thyristor TR will be energized to thereby activate heater coil L. The converse is true upon the temperature rising above a predetermined desired value, whereupon, as sensed by sensor T, the triac (thyristor) TR will discontinue conductance. In essence, thyristor or triac TR comprises a gate circuit which activates heating device L when it is conducting, and deactivates heating device L when it is not conducting. The amount of heat developed by heating device L is dependent upon length of operation of the duty cycle of thyristor or triac TR. Resistor R1 is provided to limit power control. In this embodiment, the thyristor heat sink thermostat TOR (triac, SCR or equivalent) is physically placed on thyristor TR, but electrically is so connected as to break the gate current of TR when it is activated in an ambient temperature that could produce unsafe conditions in the on state of the heating element such as when used in a blanket. The sensor TOR in other words, controls the off/on state of the thyristor TR independently of the sensor or thermistor T control function. By mounting the sensor TOR physically on top of the case of, for example, a solid state thyristor, it is possible to regulate heat to a critical degree and therefore, once it turns on it can rise to, for example, approximately 95° F., and then automatically cut off all the rest of the electronics in the circuit without impeding the normal action of the thermistors in the blanket, for example, which will operate on the normal mode in a cold room under normal conditions. In an abnormal condition, in a warm room, the sensor TOR which also can serve as a heat sink device for the thyristor TR, would rise to, for example, 95° F. and shut off all the circuitry to prevent damaging conditions. In essence, the invention is directed to disparity of temperature range for a given area to be controlled (including the voltage divider components) and the physically mounted temperature sensor on the thyristor case in receptacle. Since every thyristor dissipates heat and sometimes needs the addition of a heat sink for this dissipation, the present invention serves the function of not only dissipating the heat as a heat sink, but also critically senses the temperature of the thyristor case. The temperature range of the area heated by the heating element and the safety override device as applied directly to the case of the thyristor, one range is applied to the heated medium (resistive voltage divider) being wide and as applied to the thyristor case being critical, permits the use of the safety override device which can act to cut off any control, and will not interfere with the normal solid state electronics of the control with its sensing means located in another area itself unless an untoward or unsafe condition of room temperature or circuit actuating plug temperature is involved.

Figure 2:
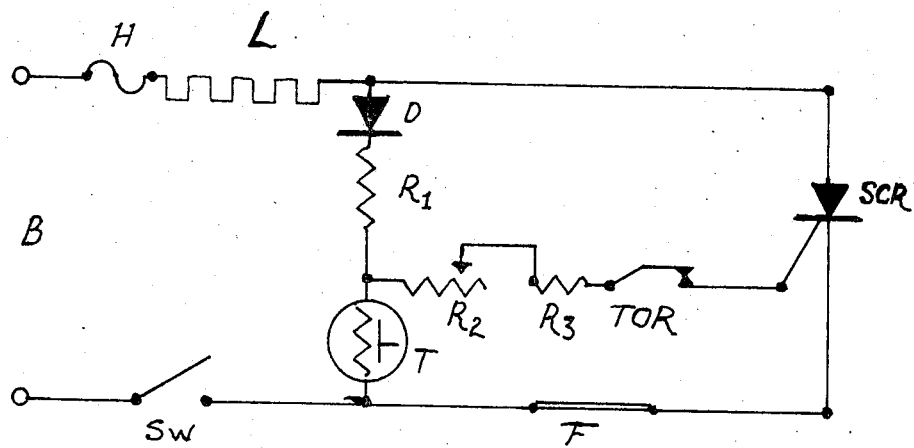
FIG. 2 depicts circuitry in accordance with the invention incorporating an SCR heating element actuator.

With reference to FIG. 2, it will be noted that the circuit as applied to terminals 1 and 2 includes in series, Heater H, heater element L, diode D, resistance R1 and temperature sensor T (thermistor) connected with the terminals. A thyristor, as shown, silicon controlled rectifier SCR is also connected operatively with terminals 1 and 2 in parallel to the first mentioned series circuit together with Switch SW and Fuse F in an SCR series connection. Temperature override sensor TOR, in the nature of a thermostat or thermistor having the desired heat operating characteristics, is connected in series with potentiometer or variable resistance R2 and resistor R3 between the gate of silicon controlled rectifier SCR and the series connected between resistance R1 and sensor T. The temperature override sensor TOR again is physically mounted on the case of thyristor or silicon controlled rectifier SCR and serves as a heat sink to the thyristor for heat dissipation when in the on state, but electrically opens or closes the gate trigger with reference to SCR current to provide a mechanical fail-safe control in balance with the solid state electronics for temperature regulation and switching. It does not affect normal control of heating element L under allowable desired surrounding temperatures, but when present in undesirably high temperatures and upon affected critical rise in temperature of SCR serves as a heat sink override control triggering fail-safe mechanism for the thyristor. The values of the various components utilized in the circuit will, of course, govern actuation of the heating coil to provide the desired temperature as affected by the heater and unsafe conditions are prevented.

For further details of operation of the circuits shown for illustrative purposes only, reference is made to my aforesaid patents and pending patent applications. A further discussion herein or explanation for an understanding of the essence of the present invention is not considered necessary.

An additional setting for use of the essence of the invention would reside in use of a voltage divider comprising resistors which would break the voltage down from, for example, 110 volt AC to a reference voltage desired, in order to amplify or eventually trigger the SCR or thyristor. In such an arrangement a unique situation might exist in that such a voltage divider ranges in temperature from approximately 120° F. down to approximately 80° F., or at worst 85° F., depending upon whether or not the thyristor itself is firing. In other words, in an off state, the voltage divider temperature in a plug connector might be in the area of 120° F., however, when the SCR or thyristor fires, the voltage divider temperature drops to about 85° F., but the case of the thyristor rises to approximately 95° F. By mounting the TOR device physically on top of the case of a solid state thyristor, it is possible to regulate heat to a critical degree and therefore once it turns on, it can rise to about 95° F. and then automatically cut off all the rest of the electronics in the circuit without impeding the normal progress of thermistors or the like in a blanket or the like, which will operate on the normal mode in a cold room under normal conditions. In an abnormal condition, as in a warm room, this heat sink device would rise to 95° F., approximately, and shut off all the circuitry. The TOR device can be incorporated in four different positions electrically while physically it is mounted on the thyristor case. The four positions are as follows:

1. in the gate of the thyristor trigger mechanism;
2. in a reference voltage position between the anode of the thyristor, and the anode of a rectifying diode just prior to the voltage divider stage;
3. in the thermistor to the base of Q1 stage; or
4. in the cathode hot line of the thyristor itself.

While operable in the four electrical positions, extremely good results are obtained in the voltage reference circuit anode of SCR or thyristor to anode of rectifying diode. The highly desirable characteristics are obtained by using a balancing act of temperature compensation between the case of the thyristor and the voltage divider resistors, with a critical range or degree with respect to the thyristor as obtainable from temperature of the case thereof, and at least a 20° spread on the voltage divider itself. For example, in an off state of the SCR the voltage divider temperature is about 120° F. in the plug. Once the SCR fires the temperature of its case rises, and the voltage divider resistors decrease their temperature. They do so in a disproportionate degree which is sufficiently radical that it enables the mechanism not to interfere with the normal electronics. Again, accordingly, the essence of the invention resides in utilization of the disparity of the temperature range between the voltage divider itself and the physically mounted temperature sensor on the thyristor case to provide fail-safe control over and above permitted normal operation of the heating element through the temperature sensors associated with an area or region wherein the temperature is to be controlled. It will be understood that the override circuit can be in the nature of a thermostatic mechanism serving as a heat sink in addition to its safety override features, or can consist of an electronic override. In any event, the mounting would be physically on the case of the SCR and/or thyristor, for thermal conductivity but insulated from it, and electrically connected in the circuit as above described.

Obviously, the essence and features of the present application residing in utilization of a temperature override sensor as described, can be useful in other circuits not included in my prior patents, pending patent applications or as shown and described herein, wherein the sensor is physically associated with the heat element actuator casing physically mounted on the case but insulated electrically therefrom, for example, and so electrically incorporated in the circuit as to control normal and additionally undesirable operating conditions. The location of the sensor can be in a control area feasibly positioned.

Manifestly, minor changes in details of construction and arrangement of parts and circuitry, within the teachings of the present invention, can be affected without departing from the spirit and scope of the invention as defined in and limited solely by the appended claims.

I claim:

1. In an electrical heating system and control circuit therefor including a heating element, voltage divider means, a temperature sensor and a heating element actuator, controllable by and in accordance with temperatures sensed by the sensor to operatively energize and deenergize the heating element, the improvement comprising:
  A. a temperature override sensor physically associated with said actuator and electrically connected in said circuit substantially between said voltage divider means and the actuator;
  B. said voltage divider means including resistors operable to break input voltage to a reference voltage adapted to amplify or trigger said actuator, the voltage divider means affording a wide temperature range during operation thereof; and
  C. said temperature override sensor being such, when so associated and circuit connected, as to operate to directly sense temperature of said actuator by differentiation therebetween and a given area temperature extraneous thereto, including the voltage divider means, to thus control open or closed circuit conditions, independent of normal control and operation of said heating element by said temperature sensor as a fail-safe override safety temperature control.

2. The invention of claim 1 wherein said actuator comprises a thyristor, or combinations thereof.

3. The invention of claim 1 wherein said actuator comprises a silicon controlled rectifier, or combinations thereof.

4. The invention of claim 1, wherein the circuit is an integrated circuit.

5. The invention as claimed in claim 4, wherein said temperature override sensor comprises a thermistor.